US008569901B2

(12) United States Patent　　(10) Patent No.: US 8,569,901 B2
Chen　　(45) Date of Patent: Oct. 29, 2013

(54) MANUAL MECHANICAL LEG-STEPPING POWER GENERATING APPARATUS

(76) Inventor: Shia-Lin Chen, Hsinchu (TW)

(*) Notice: Subject to any disclaimer, the term of this patent is extended or adjusted under 35 U.S.C. 154(b) by 84 days.

(21) Appl. No.: 13/410,270

(22) Filed: Mar. 1, 2012

(65) Prior Publication Data

US 2013/0049374 A1　　Feb. 28, 2013

(30) Foreign Application Priority Data

Aug. 26, 2011　(TW) ............................. 100215978 U

(51) Int. Cl.
*B62J 6/00*　　(2006.01)
(52) U.S. Cl.
USPC ............................................................ 290/1 R
(58) Field of Classification Search
USPC ............................................................ 290/1 R
See application file for complete search history.

(56) References Cited

U.S. PATENT DOCUMENTS

| | | | | |
|---|---|---|---|---|
| 4,541,500 A | * | 9/1985 | Gelhard | 180/205.2 |
| 5,266,065 A | * | 11/1993 | Ancarani Restelli | 474/78 |
| 5,842,535 A | * | 12/1998 | Dennis | 180/206.8 |
| 6,717,280 B1 | * | 4/2004 | Bienville | 290/1 R |
| 7,009,350 B1 | * | 3/2006 | Gold | 318/142 |
| 7,566,979 B1 | * | 7/2009 | Hartman et al. | 290/1 R |
| 7,989,970 B2 | * | 8/2011 | Yeh | 290/1 C |
| 8,362,628 B2 | * | 1/2013 | Torino | 290/1 R |
| 2005/0200221 A1 | * | 9/2005 | Vasilovich et al. | 310/156.37 |
| 2007/0085297 A1 | * | 4/2007 | Eugene Cruft | 280/252 |

FOREIGN PATENT DOCUMENTS

| | | | |
|---|---|---|---|
| BE | 867377 A | * | 9/1978 |
| EP | 769311 A1 | * | 4/1997 |
| FR | 2917368 A1 | * | 12/2008 |

* cited by examiner

*Primary Examiner* — Joseph Waks
(74) *Attorney, Agent, or Firm* — Leong C. Lei

(57) ABSTRACT

A manual mechanical leg-stepping power generating apparatus includes a leg pedal installed separately on both left and right sides of a seat pole of a bicycle, moved up and down at a position adjacent to a rider's thigh muscle, and coupled to a connecting shaft through a leg pedal link rod. Another side of the connecting shaft is coupled to a power generator shaft on the seat pole by using a support rod. The leg pedals are moved up and down alternately to drive a power generator installed in a power generator to generate electric power. When a rider rides the bicycle, kinetic energy is generated by a force applied by the rider's thigh onto the leg pedals and converted into electric energy by the leg pedals, power generator shaft and the power generator set, such that the electric energy can be supplied for the use by electric devices.

5 Claims, 5 Drawing Sheets

MANUAL MECHANICAL LEG-STEPPING POWER GENERATING APPARATUS

CROSS-REFERENCE TO RELATED APPLICATIONS

This non-provisional application claims priority under 35 U.S.C. §119(a) on Patent Application No(s). 100215978 filed in Taiwan, R.O.C. on Aug. 26, 2011, the entire contents of which are hereby incorporated by reference.

BACKGROUND OF THE INVENTION

1. Field of the Invention

The present invention relates to a manual mechanical leg-stepping power generating apparatus, in particularly to an apparatus having left and right leg pedals installed on a bicycle for generating electric power by using a user's leg power to drive the pedals, a power generator shaft and a power generator, and supplying the electric power for the use of an automobile lamp, a warning lamp, an illumination lamp, a mobile phone charger, a global positioning system (GPS), a driving recorder, a cooler, a thermal box or any other electric power driven device.

2. Description of the Related Art

In general, bicycles serve as transportation means as well as fitness equipments, and thus becoming popular, and a bicycle is driven by a rider's applying forces on leg pedals of the bicycle, such that a chain drives the wheels to rotate in order to move the bicycle forward. However, this force applying method may exhaust the rider easily, particularly the rider's front thigh muscles and leg muscles, not only affecting the rider's durability, but also affecting the riding speed.

Since thigh muscle is one of the most powerful muscles of human beings as well as a base of forces of the whole body, therefore if hamstring muscles are pressed appropriately for stepping on the pedals of the bicycle for changing the potential energy, then the load exerted onto the front thigh muscle, so as to improve the rider's riding speed and durability and facilitate the loading of the thigh muscle and calf muscle. If the force pressed onto the thigh muscles is used as the kinetic energy, and the kinetic energy is converted into electric energy, the electric energy can be supplied to an automobile lamp, a warning lamp, an illumination lamp, a mobile phone charger, a global positioning system (GPS), a driving recorder, a cooler, a thermal box or any other electric power driven device electric power.

SUMMARY OF THE INVENTION

Therefore, it is a primary objective of the present invention to provide an apparatus having left and right leg pedals installed on a bicycle, and the leg pedals are installed at positions corresponding to a rider's thigh through connecting structures such as a power generator shaft and a power generator set, and moved up and down adjacent to the positions corresponding to the rider's thigh. When the rider's thigh presses on the leg pedals, the riding speed of the bicycle and the rider's durability can be improved, and the leg power can be applied appropriately to generate electric power through the power generator shaft and the power generator set, so that the electric power can be supplied to a bicycle lamp, a warning lamp, an illumination lamp, a mobile phone charger, a global positioning system (GPS), a driving recorder, a cooler, a thermal box or any other electric power driven device installed onto the bicycle.

Another objective of the present invention is to provide a manual mechanical leg-stepping power generating apparatus, wherein a fixed or hanging battery can be installed at the rear of the power generator shaft, and the battery is provided for storing electric power, and checking whether the battery is fully charged. The hanging battery can be detached from the power generator, and used separately anytime. In other words, the electric power stored at daytime can be used for the illumination at nighttime or used by other electric devices.

In addition, the battery has an electric power output slot for plugging connectors of various different specifications (such as the USB electric power output connector or vehicle cigarette lighter) provided for supplying electric power to a mobile phone or a charger.

The technical content of the present invention will become apparent with the detailed description of preferred embodiments and the illustration of related drawings as follows.

DETAILED DESCRIPTION OF THE PREFERRED EMBODIMENTS

The technical content of the present invention will become apparent by the detailed description of the following embodiments and the illustration of related drawings as follows.

Figure 1:
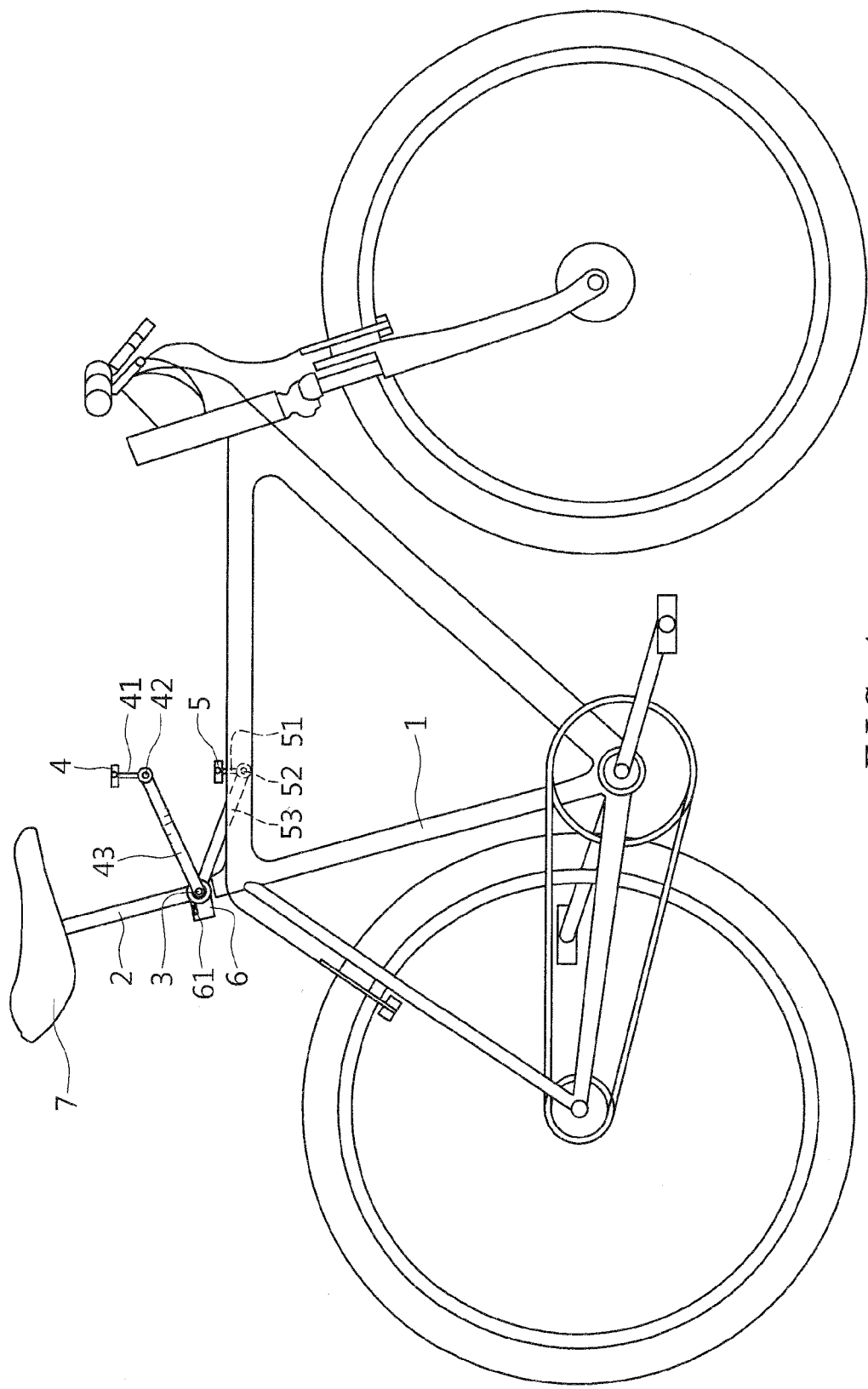
FIG. 1 is a perspective view of a preferred embodiment of the present invention.

With reference to FIG. 1 for a manual mechanical leg-stepping power generating apparatus in accordance with a preferred embodiment of the present invention, a bicycle has a bicycle frame 1, and a seat pole 2 installed thereon and the seat pole further including a chair cushion 7 or the seat pole 2 further comprises the upper section of the bicycle frame 1, characterized in that the seat pole 2 (or the bicycle frame 1) has a power generator shaft 3 installed thereon, and the power generator shaft 3 is a shaft that rotates clockwise and can be fixed or attached onto the seat pole 2 or bicycle frame, therefore, the rotation power generator having a battery 6 is attached to back side of the seat pole 2, the power generator shaft 3 is coupled to a power generator set, such that when the power generator shaft 3 rotates clockwise, the power generator in the power generator set is driven to generate electric power. In addition, the electric power can be stored in the battery 6 to comply with the requirements of the environmental protection, energy saving, carbon reduction, and green energy. Wherein, the rotating angle of the leg pedals 4, 5, a support rod 43, and another support rod 53 of the manual mechanical leg-stepping power generating apparatus can be adjusted by using the seat pole 2 as a center, so as to facilitate the storage of the leg pedals 4, 5, a support rod 43, and another support rod 53 to both left and right sides of the bottom under the seat cushion, wherein the leg pedals 4, 5 can be bent to the rear by using the connecting shafts 42, 52 as axes to facilitate users to store the leg pedals to both left and right sides of the bottom under the seat cushion.

Figure 2:
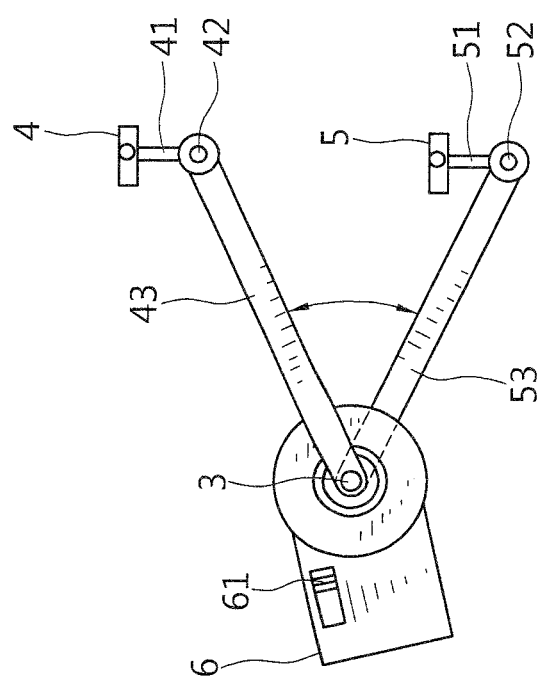
FIG. 2 is a first schematic view of a leg pedal connected with a power generator shaft in accordance with the present invention.
Figure 3:
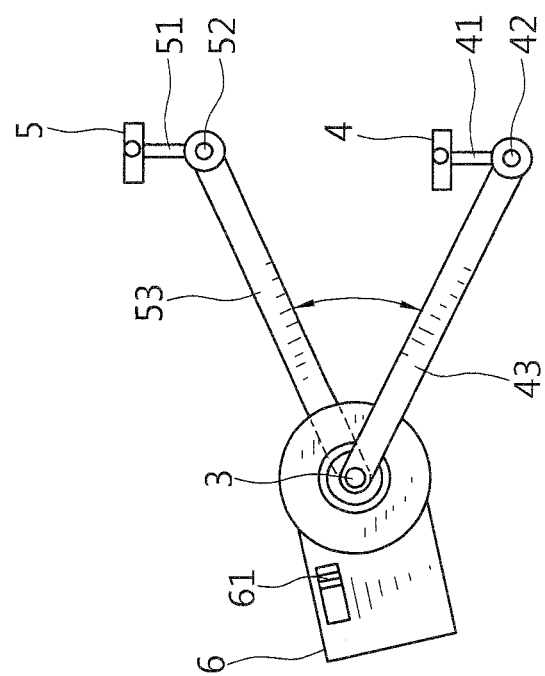
FIG. 3 is a second schematic view of a leg pedal connected with a power generator shaft in accordance with the present invention.

With reference to FIGS. 2 and 3, the seat pole 2 includes a leg pedal 4, 5 installed on both left and right side of the seat pole 2, and the leg pedals 4, 5 can be alternately moved up and down at positions corresponding to the rider's thigh. In addition, the leg pedals 4, 5 are coupled to the connecting shafts 42, 52 through a leg pedal link rod 41, 51, and a support rod 43, 53 is installed at another end of the connecting shaft 42, 52, and then the support rod 43, 53 is coupled to the power generator shaft 3. When the leg pedal 4, 5 is pressed downward, a clockwise gear drives the power generator shaft 3 to rotate clockwise. If the leg pedal 4, 5 is moved upward, the leg pedal 4, 5 is in an idle rotating state. Further, the leg pedal 4, 5 the leg pedal link rod 41, 51 and the support rod 43, 53 is an adjustable link rod, whose length, height, and angle can be adjusted, and the link rod 41, 51 can be in the shape of a pillar, an arc, a plate, or a meniscus. The leg pedals 4, 5 are structure with adjustable length and width and made of a material capable of providing a comfortable feeling for the rider's legs, and the leg pedals 4, 5 are designed with a shape corresponding to the shape of the rider's thigh and partially wrapping the rider's leg to provide a better way for applying the force and a better operation. The position of the leg pedal 4, 5 can be adjusted to an appropriate position corresponding to the rider's thigh (such as the middle of the thigh and proximate to the hip or knee) to improve the rider's comfort and stability.

Figure 4:
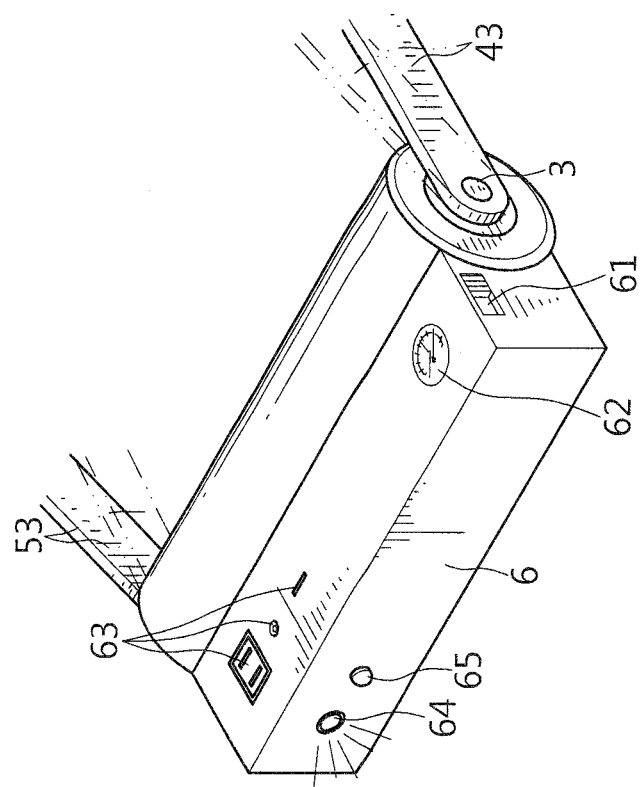
FIG. 4 is a schematic view of a battery of the present invention.
Figure 5:
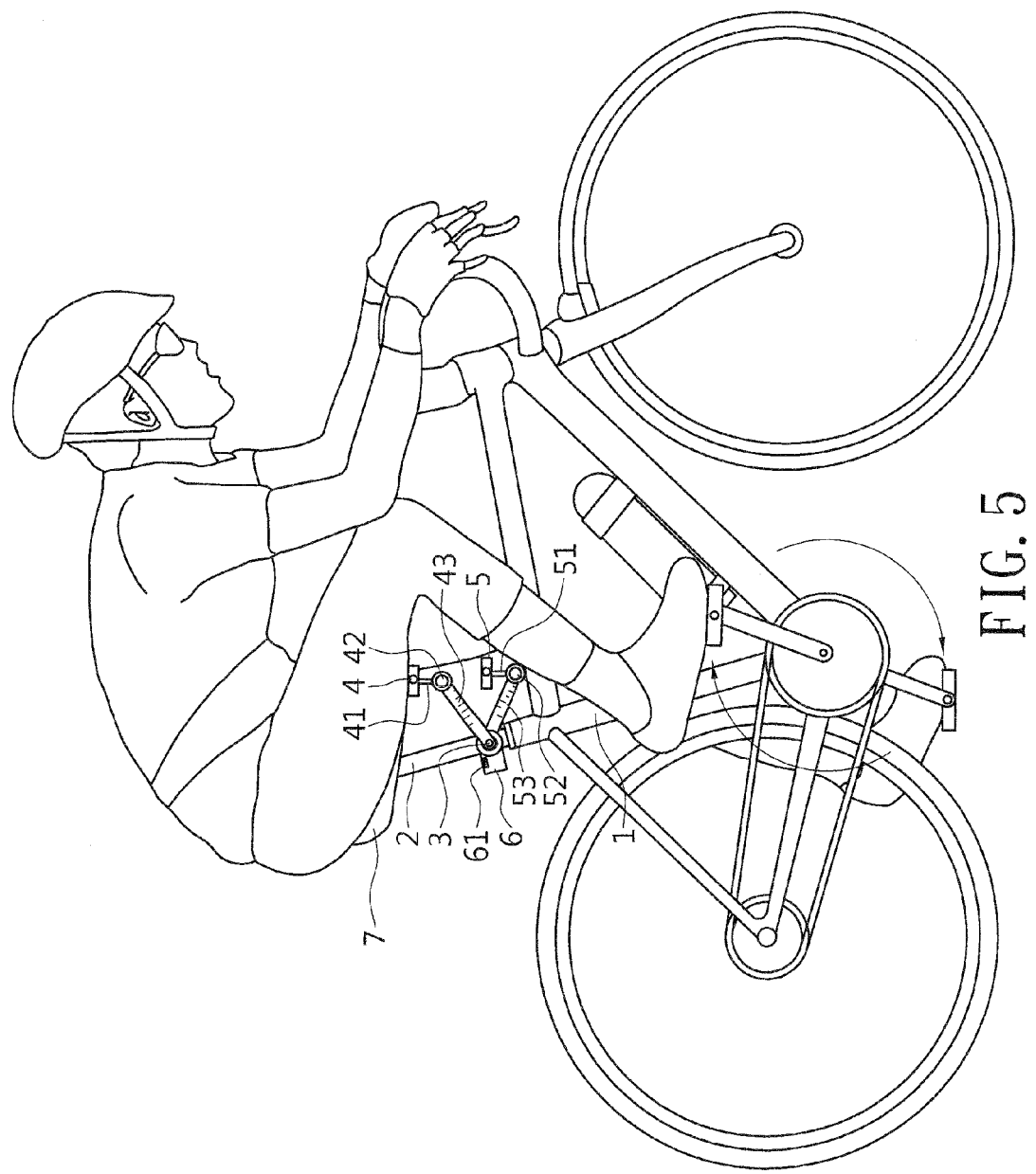
FIG. 5 is a schematic view of an application in accordance with a preferred embodiment of the present invention.

With reference to FIG. 4, the power generator shaft 3 has a battery 6 (fixed battery or hanging battery) at the rear of the power generator shaft 3, and the battery 6 can be a rechargeable battery with an electric power output switch (ON/OFF) 61 and an electric power meter 62 installed therein, so that the level of electric power of the battery can be checked. The battery is detachable from the power generator set, so that the battery can be used for supplying electric power anytime. In other words, the electric power stored at daytime can be used at nighttime, and supplied to other electric devices. The electric power can be supplied for, a warning lamp 65, a bicycle lamp, an illumination lamp 64, a mobile phone charger, a global positioning system (GPS), a driving recorder, a cooler, a thermal box or any other electric device. The warning lamp 65 can also comprises tail lamp and directional lamp which provides warning effect. Wherein, the leg pedal link rod 41, 51 and the support rod 43, 53 are structures with an adjustable length to fit different physical sizes of riders. With reference to FIG. 5, if the rider rides a bicycle, the kinetic produced by the force of the rider's thigh can drive the power generator set to convert the kinetic energy into electric energy through the leg pedal link rods 41, 51, the connecting shafts 42, 52, the support rods 43, 53 and the power generator shaft 3, so as to supply electric power to drive the devices and improve the riding efficiency.

In addition, the battery 6 has an electric power output slot 63 for installing connectors of various different connector specifications (such as the USB electric power output connector or vehicle cigarette lighter) and supplying electric power to mobile phones and chargers.

In summation of the description above, the manual mechanical leg-stepping power generating apparatus of the present invention can reduce the fatigue of the front thigh and the calf muscles while the rider is riding the bicycle by installing a leg pedal on both left and right sides of the bicycle separately, and the leg pedals can be moved alternately up and down at positions corresponding to the rider's thigh to enhance the comfort and durability of riding the bicycle. The kinetic energy generated by applying forces at the leg pedals by the rider's thigh can be transmitted from the leg pedals 4, 5 to the power generator shaft 3 to drive the power generator set to generate electric power, and the electric power generated by the power generator can be supplied to various electric devices or stored into a battery. Obviously, the present invention improves over the prior art, and complies with the patent application requirements, and thus is duly filed for patent application.

What is claimed is:

1. A manual mechanical leg-stepping power generating apparatus, comprising a power generator shaft installed on a seat pole on a bicycle frame, a leg pedal installed separately on both left and right sides of the seat pole, and moved up and down adjacent to a position corresponding to a rider's thigh, and each leg pedal being coupled to a connecting shaft by using a leg pedal link rod, and another end of the connecting shaft being coupled to a power generator shaft by using a support rod, and the power generator shaft being coupled to a power generator set, and electric power generated by a power generator in the power generator set being supplied for the use of an electric device.

2. The manual mechanical leg-stepping power generating apparatus of claim 1, wherein each link rod of the leg pedal is a structure with adjustable length, height, angle, shape, and installation position corresponding to the rider's thigh.

3. The manual mechanical leg-stepping power generating apparatus of claim 1, further comprising a battery installed on the power generator shaft, and the battery having one selected from the collection of an electric power output slot, an illumination lamp, a warning lamp, an electric power output switch and an electric meter.

4. The manual mechanical leg-stepping power generating apparatus of claim 1, wherein the seat pole further includes a chair cushion.

5. The manual mechanical leg-stepping power generating apparatus of claim 1, wherein the seat pole is integrated formed with the bicycle frame.

* * * * *